United States Patent Office 2,837,530
Patented June 3, 1958

2,837,530

PROCESS FOR THE MANUFACTURE OF SALTS OF SULPHURIC ACID ESTERS OF LEUCO VAT DYE-STUFFS OF THE ANTHRAQUINONE SERIES

Walter Oppliger and Eduard Peyer, Basel, Switzerland, assignors to Durand & Huguenin A. G., Basel, Switzerland, a Swiss firm No Drawing. Application February 19, 1954
Serial No. 411,568

Claims priority, application Switzerland
February 20, 1953

7 Claims. (Cl. 260—316)

In copending application Ser. No. 370,224, filed July 24, 1953, there is described a process for the manufacture of water-soluble salts of sulphuric acid esters of leuco vat dyestuffs of the anthraquinone series which are difficult to esterify, wherein the vat dyestuff is treated in a mixture of α-picoline and methylene-bis-p,p′-(N:N-diethylcyclohexylamine) containing 10–60 percent by weight of the latter amine and in the presence of finely divided iron, cobalt, nickel, copper or a copper alloy with chlorosulphonic acid or an equivalent mixture of SO₃ and HCl in the form of addition products with the said bases, and the resulting sulphuric acid ester compound is converted into a water-soluble ester salt.

The present invention modifies the aforesaid process by using, instead of the mixture of α-picoline and methylene-bis-p,p′-(N:N-diethylcyclohexylamine), a mixture of at least one dialkyl-formamide of the general formula

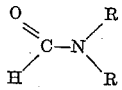

in which each R represents —CH₃ or —C₂H₅, and methylene-bis-p,p′-(N:N-diethylcyclohexylamine) containing 10–70 percent by weight of the latter amine.

As vat dyestuffs of the anthraquinone series which are difficult to esterify there are to be understood those of which the sulphuric acid ester salts can be obtained by the usual methods of esterification only in small yields, that is to say, yields which are insufficient for commercial purposes or are trace-like, or in the form of products which cannot be converted or can be converted only partially into the original dyestuff by the usual method of application. For the purposes of the present invention, the anthraquinone vat dyestuffs in question are those which are difficult to esterify as determined by the test given in application, Ser. No. 212,834, filed March 26, 1951, namely, those anthraquinone vat dyestuffs which give an ester yield of less than 25% relative to the weight thereof when esterified by means of a mixture of α-picoline and chlorosulphonic acid (10:1 by weight) in the presence of copper powder. Vat dyestuffs of the anthraquinone series which are difficult to esterify are found, for example, in the following classes:

(1) 1-aroylaminoanthraquinones which contain as a substituent in the 4-, 5- or 8-position an acylamino or alkoxy group or halogen atom, and especially diaroyl-amino-anthraquinones and their derivatives containing substituents in the benzene nuclei.

(2) Anthraquinone-carbazoles.

(3) Anthrimides.

The chlorosulphonic acid may be introduced into the reaction mixture as such or partially or completely in the form of an equivalent mixture of sulphur trioxide and hydrogen chloride or in the form of a sulphur trioxided addition product and a hydrochloride of one or both of the bases used.

The dialkyl-formamide of the above general formula may be used in pure form or in the form of a commercial product. Moreover, a mixture of dimethyl-formamide and diethyl-formamide in any desired relative proportions may be used.

Methylene - bis - p,p′ - (N:N - diethyl - cyclohexylamine) of the formula:

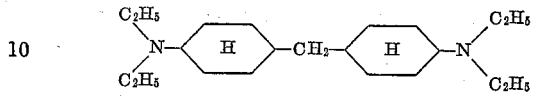

can be prepared by the catalytic hydrogenation of 4:4′-tetraethylamino-diphenyl-methane, which latter compound can be obtained, for example, by treating diethyl-aniline with formaldehyde/hydrogen chloride. Methylene-bis-p,p′-(N:N-diethylcyclohexylamine) is a water-clear oily liquid, and may be used either as the pure base or in the form of a technically anhydrous product. The use of a mixture of a dialkyl-formamide and methylene-bis-p,p′-(N:N-diethyl-cyclohexylamine) in suitable relative proportions is of critical importance in the present process. Thus, in order to obtain commercially valuable results it is essential that the proportion of methylene-bis-p,p′-(N:N-diethyl-cyclohexylamine) in the mixture of bases should be at least 10 and at most 70 percent on the weight of the mixture. Advantageously the proportion of the said amine lies within the range of 25–60 percent, as then yields of usable sulphuric acid ester salts of more than 90 percent can be obtained. In order to obtain an optimum yield of sulphuric acid ester salt the proportion of methylene-bis-p,p′-(N:N-diethylcyclohexylamine) must be chosen within the aforesaid proportions depending on the behaviour of the particular vat dyestuff used.

In carrying out the process it is not essential to use from the outset a mixture of a dialkylformamide and methylene - bis - p,p′ - (N:N-diethylcyclohexylamine), so that, for example, one of the components of the mixture of bases may first be reacted with chlorosulphonic acid and then a suitable quantity of the other component is added. It is essential only that, before the commencement of the esterification reaction, the two bases should be present in suitable relative proportions. It will be understood that for the esterification it is necessary to use at least two proportions of chlorosulphonic acid for each anthraquinone nucleus present in the vat dyestuff.

The proportion of the basic mixture must be such as to provide at least 1.4 molecular proportions of methylene-bis-p,p′-(N:N-diethyl-cyclohexylamine) for every two molecular proportions of chlorosulphonic acid used, except that if less than four molecular proportions of the acid is used not less than two molecular proportions of the said amine should be present for every two molecular proportions of the acid. However, in order to obtain optimum results, it will usually be necessary to use a proportion of chloro-sulphonic acid, and correspondingly of the basic mixture several times greater than the minimum proportions mentioned above. The most favourable excess to use depends on the properties of the particular dyestuff to be esterified, and can easily be determined by preliminary tests.

The sulphuric acid ester compound resulting from the esterification is converted into a water-soluble ester salt by a method in itself known, for example, by treatment with a suitable base or by any other conventional method. Especially suitable water-soluble sulphuric acid ester salts are the lithium, sodium, potassium, ammonium and hydroxy-alkylamine salts.

In the present process there is used as the metal finely divided iron, nickel, cobalt, copper or a copper alloy. By the expression "finely divided" there is to be understood, for example, the powdered form hitherto used, and preferably a fineness such that the metal passes through a 150–200 mesh sieve (see Handbook of Chemistry and Physics, 31st edition, page 2669). The proportion of the metal should be at least 1.5, and preferably at least 2, atomic proportions for each anthraquinone nucleus present in the vat dyestuff. However, it will usually be of advantage to use a proportion considerably in excess of the minimum proportion.

In one form of the process the reaction is carried out in the presence of not only one of the said metals, but in the presence of a plurality of these metals. It is of special advantage from the practical point of view to use iron, owing to its low cost.

In another form of the process the metal to be used is subjected to an activating treatment prior to the esterification process and in the absence of the vat dyestuff to be esterified.

This activating treatment may be carried out in various ways, for example:

(1) By the addition of the metal powder to the basic mixture and the subsequent introduction of the chlorosulphonic acid dropwise.

(2) By the addition of the metal powder to a preformed mixture of dialkyl-formamide/$SO_3$ and dialkyl-formamide/HCl and the introduction of the methylene-bis-p,p'-(N:N-diethyl-cyclohexylamine).

(3) By introducing the chlorosulphonic acid dropwise into the basic mixture and then adding the metal powder.

(4) By activating the metal powder in the absence of the basic mixture and subsequently adding it to that mixture.

Thus, the activation may be carried out, for example, by treating iron powder for a short time with glacial acetic acid at a raised temperature, filtering with suction, and washing the filter residue (consisting of activated iron) with the dialkyl-formamide, or by any other well known method.

If desired, the process of this invention may be carried out with the exclusion of oxygen.

The new process is distinguished in that it is possible by starting from the vat dyestuff to obtain in a single operation and in very good yield a sulphuric acid ester salt which can be reconverted into the original dyestuff by the known methods of application.

The following examples illustrate the invention, the parts being by weight:

Example 1

25 parts of chlorosulphonic acid are introduced dropwise, while stirring and cooling, at 0° C. into 150 parts of anhydrous dimethyl-formamide, and 25 parts of iron powder are added. For the purpose of activating the metal the temperature is allowed to rise to 20° C. in the course of 30 minutes while stirring. There are then added dropwise, while cooling, 60 parts of methylene-bis-p,p'-(N:N-diethyl-cyclohexylamine) and 10 parts of the carbazole of di-(5'-benzoylamino-1'-anthraquinonyl)-2:8-diaminochrysene. The whole is stirred for 5 hours at 50° C., during which the dyestuff slowly dissolves to give a dark brown coloration.

In order to work up the product the reaction mixture is introduced into 1000 parts of sodium carbonate solution of 5 percent strength, whereby a green yellow precipitate is formed, and the latter is isolated by filtration and stirred with 500 parts of a sodium hydroxide solution of 2 percent strength at 30° C. for 30 minutes. The methylene - bis - p,p' - (N:N - diethylcyclohexylamine) which separates out is removed by extraction with benzene, and isolated from the aqueous solution of the sulphuric acid ester salt by salting out.

The sulphuric acid ester salt precipitates in a yield of about 90 percent. When applied to cotton by the known methods yellow-brown tints having excellent properties of fastness are obtained.

Instead of 25 parts of iron powder there may be used with equal success 25 parts of brass powder or 25 parts of Raney nickel (prepared as described by Paul and Hilly, Bulletin de la Société Chimique de France, series 5, volume 6, page 1393 [1939]).

Instead of the carbazole of di-(5'-benzoylamino-1'-anthraquinonyl)-2:8-diaminochrysene there may be used with similar success the carbazolised 8':8''-dibenzoylamino-1:4:1':1''-trianthrimide prepared from 1:4-diaminoanthraquinone and 1-chloro-8-benzoylaminoanthraquinone.

Example 2

25 parts of chlorosulphonic acid are introduced dropwise at 0° C. into 150 parts of dimethyl-formamide, while cooling and stirring, 25 parts of iron powder are added, and the temperature is allowed to rise to 10° C. in the course of 30 minutes while stirring. While cooling the mixture, 60 parts of methylene-bis-p,p'-(N:N-diethyl-cyclohexylamine) are added dropwise, and 10 parts of 1-benzoylamino-4-(4'-dimethyl-sulphonamido)-benzoylaminoanthraquinone are introduced. Owing to the reaction which sets in the temperature rises to about 30° C. In order to complete the reaction the mixture is stirred for a further 2 hours at 50° C. The reaction mixture is worked up as described in Example 1. The sulphuric acid ester salt is obtained in a yield of about 90 percent.

25 parts of copper powder can be used with equal success instead of 25 parts of iron powder. If the process is carried out in the absence of methylene-bis-p,p'-(N:N-diethyl-cyclohexylamine) or if it is replaced by 60 parts of dimethyl-formamide, there are obtained under otherwise identical conditions only traces of the sulphuric acid ester salt.

Example 3

30 parts of chlorosulphonic acid are introduced dropwise, while cooling and stirring, into 150 parts of dimethyl-formamide, and 15 parts of brass powder, 60 parts of methylene-bis-p,p'-(N:N-diethyl-cyclohexylamine) and 10 parts of the anthrimide prepared from 1:3-dichloro-2-methyl-anthraquinone and 1:4-monobenzoyl-diaminoanthraquinone are added. After stirring the mixture for 4 hours at 60° C. the reaction ceases. The sulphuric acid ester salt is isolated as described in Example 1. The yield exceeds 80 percent.

The brass powder may be replaced by 10 parts of activated cobalt powder or 15 parts of a mixture of 7.5 parts of copper powder and 7.5 parts of iron powder.

By using, instead of 150 parts of dimethyl-formamide and 60 parts of methylene-bis-p,p'-(N:N-diethyl-cyclohexylamine), 135 parts of dimethyl-formamide and 15 parts of methylene - bis - p,p' - (N:N - diethyl - cyclohexylamine) and working otherwise under the same conditions, the yield of the sulphuric acid ester salt falls to under 40 percent.

On the other hand, by using in this example 80 parts of dimethyl-formamide and 160 parts of methylene-bis-p,p'-(N:N-diethyl-cyclohexylamine), the sulphuric acid ester salt is obtained in a yield of 75 percent.

Example 4

To a mixture prepared in the cold from 150 parts of dimethyl-formamide and 25 parts of chlorosulphonic acid are added 25 parts of iron powder, and the latter is activated as described in Example 1. There are then added 60 parts of methylene-bis-p,p'-(N:N-diethyl-cyclohexylamine) and 10 parts of 1:4-dibenzoylaminoanthraquinone. Due to the liberated heat of reaction the temperature rises to 40° C. After stirring the mixture for 5 hours, the product is worked up as described in Example 1. The sulphuric acid ester salt is obtained in a yield of about 90 percent.

If, in this example the 60 parts of methylene-bis-p,p'-(N:N-diethylcyclohexylamine) were omitted, and the procedure were the same in other respects, there would be obtained a water-soluble product which could no longer be reconverted into the original vat dyestuff by acid oxidation.

*Example 5*

30 parts of chlorosulphonic acid are introduced dropwise, while cooling and stirring, into 150 parts of dimethylformamide, and then 20 parts of brass powder, 90 parts of methylene-bis-p,p'-(N:N-diethyl-cyclohexylamine) and 10 parts of 1:5-dibenzoylaminoanthraquinone are added. The whole is stirred with the exclusion of moisture for 7 hours at 60° C. The product is worked up as described in Example 1. The yield of the sulphuric acid ester salt is approximately quantitative.

Instead of using 1:5-dibenzoylaminoanthraquinone, 10 parts of 1-benzoylamino-5-chloroanthraquinone or 10 parts of 1-benzoylamino-4-methoxyanthraquinone can be converted into its sulphuric acid ester salt with equal success under the same conditions.

By replacing the 150 parts of dimethyl-formamide by 150 parts of diethyl-formamide, the sulphuric acid ester salt of leuco-1:5-dibenzoylaminoanthraquinone is likewise obtained in good yield.

*Example 6*

A mixture of 80 parts of diethyl-formamide and 12 parts of chlorosulphonic acid is prepared in the cold, and there are rapidly added in succession 10 parts of iron powder, 45 parts of methylene-bis-p,p'-(N:N-diethyl-cyclohexylamine) and 5 parts of 1:4-dibenzoylaminoanthraquinone. The mixture heats up to 35° C., and is stirred for a further 4 hours at 50° C. in order to complete the reaction. The sulphuric acid ester salt is obtained in good yield by working up in the manner described in Example 1.

Similar results are obtained by using, instead of 10 parts of iron powder, 10 parts of brass powder or 10 parts of copper powder.

*Example 7*

12 parts of chlorosulphonic acid are introduced dropwise, while cooling and stirring, into a mixture of 40 parts of dimethylformamide and 40 parts of diethyl-formamide. There are then added 10 parts of brass powder, 45 parts of methylene-bis-p,p'-(N:N-diethylcyclohexylamine) and 5 parts of 1:4-dibenzoylaminoanthraquinone, and the reaction mixture is heated for 4 hours at 50° C. while stirring. The product is worked up as described in Example 1. The sulphuric acid ester salt of leuco-1:4-dibenzoylaminoanthraquinone is obtained in good yield.

Instead of 5 parts of 1:4-dibenzoylaminoanthraquinone, there may be used with equal success 5 parts of 1:5-dibenzoylaminoanthraquinone.

Furthermore, the 10 parts of brass powder may be replaced by 10 parts of iron powder activated as described in Example 1.

What we claim is:

1. A process for the manufacture of a water-soluble salt of a sulphuric acid ester of a leuco vat dyestuff of the anthraquinone series which is difficult to esterify, giving an ester yield of less than 25% relative to the weight thereof when esterified by means of a mixture of α-picoline and chlorosulphonic acid (10:1 by weight) in the presence of copper powder, which comprises subjecting the vat dyestuff, in a mixture of at least one dialkyl-formamide of the general formula

in which each R is selected from —$CH_3$ and —$C_2H_5$, and methylene-bis-p,p' - (N:N-diethyl-cyclohexylamine) containing 10–70 percent by weight of the latter amine and in the presence of a finely divided metal selected from the group consisting of iron, cobalt, nickel, copper and a copper alloy to the action of a member selected from the group consisting of chlorosulphonic acid and an equivalent mixture of $SO_3$ and $HCl$ in the form of its addition products with the said bases, and converting the resulting sulphuric acid ester compound into a water-soluble ester salt.

2. A process as claimed in claim 1, wherein the said mixture of bases contains 25–60 percent of methylene-bis-p,p'-(N:N-diethyl-cyclohexylamine).

3. A process as claimed in claim 1, wherein the vat dyestuff is 1:4-dibenzoylamino-anthraquinone.

4. A process as claimed in claim 1, wherein the vat dyestuff is 1:5-dibenzoylaminoanthraquinone.

5. A process as claimed in claim 1, wherein the vat dyestuff is 1-benzoylamino-4-(4'-dimethylsulphonamido)-benzoylamino-anthraquinone.

6. A process as claimed in claim 1, wherein the vat dyestuff is carbazolised di-(5'-benzoylamino-1'-anthraquinoyl)-2:8-diaminochrysene.

7. A process as claimed in claim 1, wherein the vat dyestuff is the anthrimide prepared from 1:3-dichloro-2-methylanthraquinone and 1:4-monobenzoyl-diaminoanthraquinone.

References Cited in the file of this patent

UNITED STATES PATENTS

| 2,403,226 | Lecher et al. | July 2, 1946 |
| 2,506,580 | Coffey et al. | May 9, 1950 |
| 2,508,814 | Coffey et al. | May 23, 1950 |
| 2,604,477 | Coffey et al. | July 22, 1952 |
| 2,705,717 | Oppliger | Apr. 5, 1955 |

FOREIGN PATENTS

| 690,682 | Great Britain | Apr. 29, 1953 |